United States Patent [19]

Duarte

[11] Patent Number: 4,822,150
[45] Date of Patent: Apr. 18, 1989

[54] OPTICAL DEVICE FOR ROTATING THE POLARIZATION OF A LIGHT BEAM

[75] Inventor: Francisco J. Duarte, Rochester, N.Y.

[73] Assignee: Eastman Kodak Company, Rochester, N.Y.

[21] Appl. No.: 50,809

[22] Filed: May 18, 1987

[51] Int. Cl.$^4$ .............................................. G02B 5/04
[52] U.S. Cl. ....................................... 350/394; 350/286
[58] Field of Search ........................ 350/398, 286, 394

[56] References Cited

U.S. PATENT DOCUMENTS

| | | | |
|---|---|---|---|
| 2,601,246 | 6/1952 | Valensi | 343/100 |
| 3,360,323 | 12/1967 | Weisman et al. | 350/286 |
| 4,084,883 | 4/1978 | Eastman et al. | 350/152 |
| 4,101,199 | 7/1978 | Christensen | 350/152 |
| 4,252,410 | 2/1981 | Jain | 350/370 |
| 4,307,408 | 12/1981 | Kiyehara | 346/76 L |
| 4,392,722 | 7/1983 | Shirasaki | 350/375 |
| 4,525,034 | 6/1985 | Simmons | 350/395 |

FOREIGN PATENT DOCUMENTS 971463 1/1959 Fed. Rep. of Germany ...... 350/286

OTHER PUBLICATIONS

Szatmari, S. et al, "Comparative Study of the Gain Dynamics of XeCl and KrF with Subpicosecond Resolution", JOSA, vol. 4, Dec. 1987, pp. 1943-1944.

*Primary Examiner*—Bruce Y. Arnold
*Attorney, Agent, or Firm*—Donald D. Schaper

[57] ABSTRACT

An optical device is disclosed for rotating the polarization of a light beam, in particular a laser beam. In one embodiment of the invention, the device comprises a prism which is adapted to rotate the polarization of a linearly-polarized beam of radiation by 90° and to change the direction of the beam. In a second embodiment, an optical device comprising a plurality of prismatic surfaces is adapted to receive a linearly-polarized input beam and to produce a linearly-polarized output beam which is collinear with the input beam and which is polarized orthogonally to the polarization of the input beam.

2 Claims, 2 Drawing Sheets

OPTICAL DEVICE FOR ROTATING THE POLARIZATION OF A LIGHT BEAM

FIELD OF THE INVENTION

This invention relates to a device for rotating the polarization of a light beam, and more particularly, to such a device which is adapted to produce an output beam in which the polarization is orthogonal to the polarization of the input beam.

STATE OF THE PRIOR ART

Both continuous wave lasers and pulsed lasers can emit highly polarized radiation. Many optical systems which utilize pump laser radiation have polarization characteristics transverse to the optical excitation source; this results in a considerable loss of energy and a reduction in efficiency. For example, in a system in which a copper laser pumps a dye laser, the copper laser emits radiation that is polarized perpendicular to the lane of incidence whereas the recipient dye laser is more efficient with pump radiation polarized parallel to the plane of incidence. In order to improve the efficiency of this combination, the polarization of the pump radiation must be made compatible with the dye laser. It is, of course, possible with small lasers to alter the optical configuration of the pump laser by physically rotating the apparatus; however, this is quite impractical with large laser devices.

Commercially-available polarization rotators include single-wavelength rotators and achromatic Fresnel Rhomb retarders. The single-wavelength rotators, although relatively inexpensive, are only useful for a very limited range of wavelengths. The achromatic Fresnel Rhomb retarders can be used over a wide range of wavelengths, but they are relatively expensive.

In U.S. Pat. No. 4,252,410, there is shown apparatus in which a plurality of mirrors are used to rotate the polarization of a substantially linearly-polarized beam of radiation. This apparatus, however, is relatively expensive and is too large and cumbersome for many applications. Another disadvantage of the apparatus is that the mirrors must be maintained in precise alignment to produce acceptable results.

SUMMARY OF THE INVENTION

It is an object of the present invention to overcome the problems in the prior art and to provide an optical device for rotating the polarization of a beam which is relatively simple, compact, and which is operable over a wide range of wavelengths.

In accordance with the present invention, there is provided an optical device for rotating the polarization of a linearly-polarized input beam of radiation, the device comprising: prism means for receiving the input beam and for projecting a linearly-polarized output beam of radiation, the polarization of the output beam being at a predetermined angle to the polarization of the input beam.

In one embodiment of the present invention, the optical device is a prism having surfaces arranged to rotate the polarization of a linearly-polarized input and to produce an output beam which is at an angle to the input beam. In a second embodiment of the invention, the optical device includes a plurality of prismatic surfaces which rotate the polarization of a linearly-polarized input beam and also produce an output beam which is collinear with the input beam.

The optical device of the present invention provides a simple, compact, and inexpensive means for rotating the polarization of a beam of radiation. The device is particularly adapted for use with optical systems which utilize pump laser radiation. A further advantage of the device is that it is operable over a relatively wide range of wavelengths.

Other features and advantages will become apparent with reference to the following Description of the Preferred Embodiments when read in light of the attached drawings.

DESCRIPTION OF THE PREFERRED EMBODIMENTS

As used herein, the term "P-polarization" refers to linearly-polarized light in which the direction of polarization is parallel to the plane of incidence, and the term "S-polarization" refers to linearly-polarized light in which the direction of polarization is perpendicular to the plane of incidence.

Figure 1:
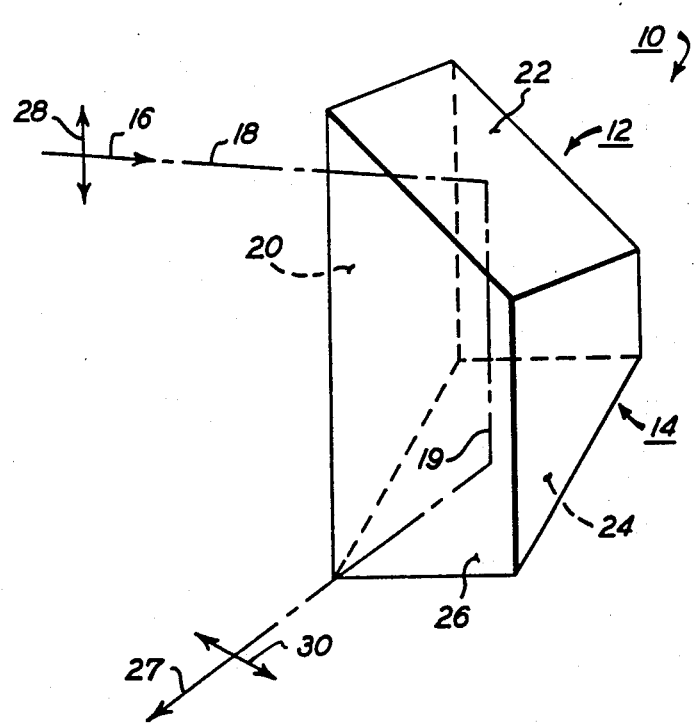
FIG. 1 is a perspective view of one embodiment of the present invention.
Figure 2:
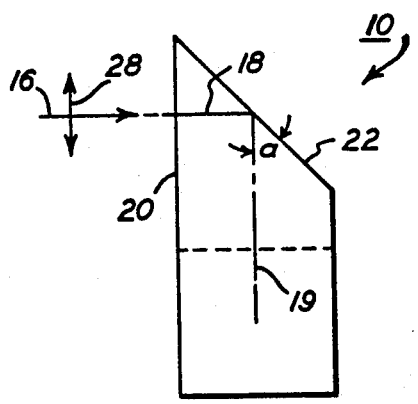
FIG. 2 is an front elevational view of the embodiment shown in FIG. 1.
Figure 3:
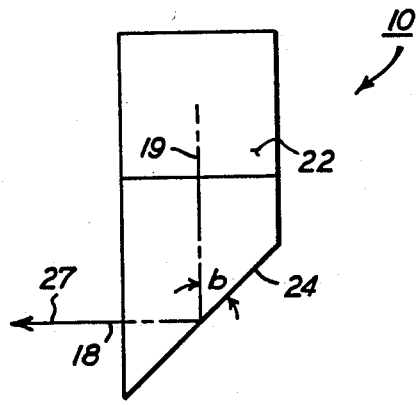
FIG. 3 is a side elevational view of the embodiment of FIG. 1, as viewed from the right in FIG. 1.

With reference to FIG. 1, there is shown an optical device 10 constructed in accordance with the present invention. Optical device 10 is a prism which includes two right-angle elements 12 and 14. As shown in FIG. 1, an input beam 16 travels along an optical path of propagation 18, enters device 10 through surface 20, is reflected by surface 22, is reflected again by surface 24, and exits through surface 26 of device 10 as an output beam 27. The input beam 16 is linearly polarized and is S-polarization, as indicated by arrow 28 in FIG. 1. Output beam 27 is linearly polarized and is P-polarization, as indicated by arrow 30. Thus, the polarization of beam 16 is at a 90° angle to the polarization of the beam 27. As shown in FIG. 1, an optical axis 19, located along the optical path of propagation 18, extends between surface 22 and surface 24. Both surfaces 22 and 24 form the same angle with axis 19; however, surface 22 is rotated 90° about axis 19 relative to surface 24. It is this arrangement of surfaces 22 and 24 which rotates the polarization of the beam. The angular relationship between axis 19 and the surfaces 22 and 24 is further illustrated in FIGS. 2 and 3. In FIG. 2, surface 22 is shown as forming an angle "a" with axis 19, and in FIG. 3, surface 24 is shown as forming an angle "b" with axis 19. As noted above, surfaces 22 and 24 form the same angle with axis 19, that is, angles a and b are equal.

Figure 4:
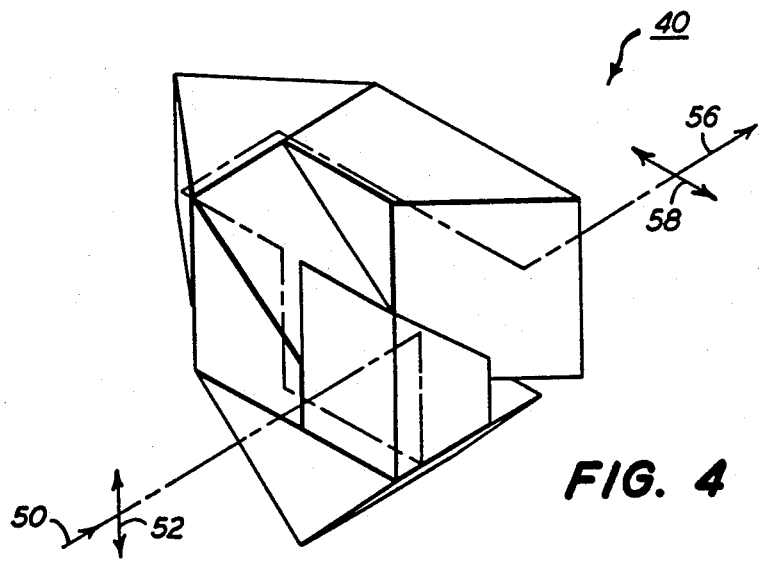
FIG. 4 is a perspective view of a second embodiment of the present invention.
Figure 5:
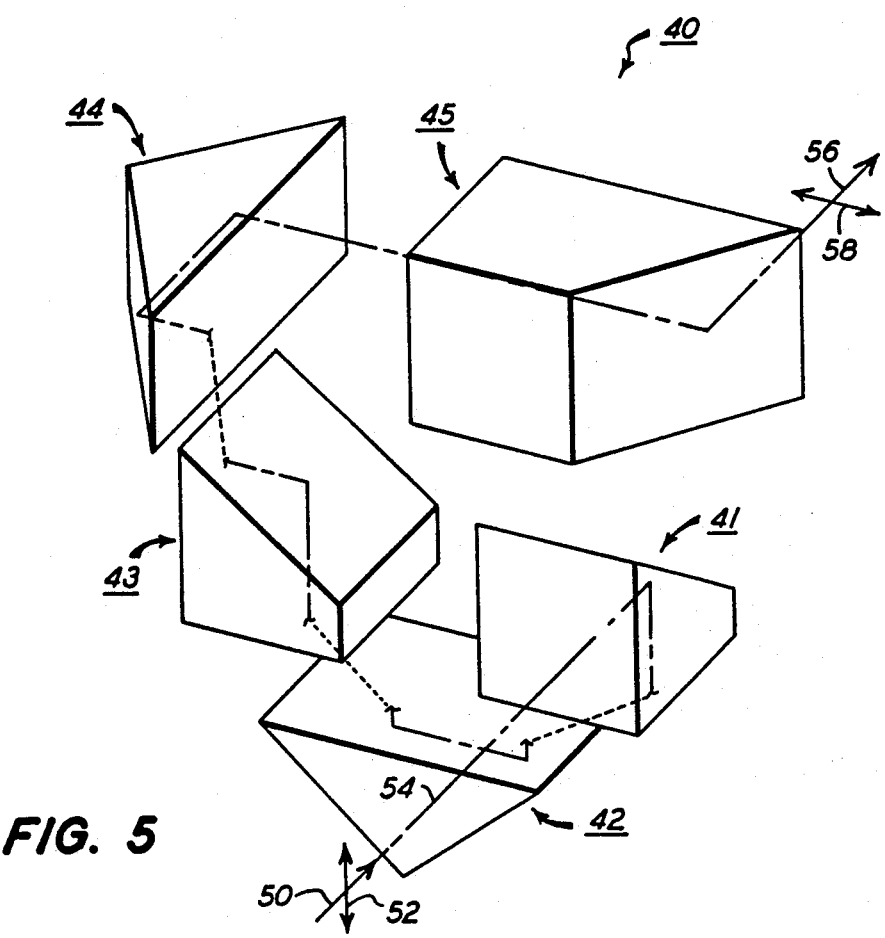
FIG. 5 is an exploded perspective view of the embodiment shown in FIG. 4.

A second embodiment of the present invention is shown in FIGS. 4 and 5. As shown in FIG. 5, an optical device 40 is formed from prisms 41, 42, 43, 44, and 45. Prisms 41 and 43 are folding right-angle prisms with a 45° apex angle. Prisms 42 and 44 are retroreflectors, and prism 45 is a folding prism. A linearly-polarized input beam 50 travels through device 40 along an optical path of propagation 54 and exits as a linearly-polarized output beam 56. Input beam 50 is S-polarization, as indicated by arrow 52, and output beam 56 is P-polarization, as indicated by arrow 58. Rotation of the polarization of the input beam 50 is accomplished by prisms 41 and 42 in the manner explained above for device 10. The function of prisms 43, 44, and 45 is to make the output beam 56 collinear with input beam 50. It will be apparent to those skilled in the art that device 40 can be integrated in different ways without departing from the scope of the invention. For example, one arrangement (not shown) would be to use device 10 with a retroreflector, an output prism similar to prism 45, and a 45° prismatic parallelogram to couple the device 10 to the retroreflector.

Optical devices 10 and 40 can be made from BK-7 glass, obtainable from the Schott Glass Co., which transmits in the range of 400–2,000 nm. Another suitable material is quartz which operates in the range of 180–2000 nm.; a satisfactory quartz is sold under the trademark "Suprasil" by the Heraeus Corp. Devices 10 and 40 can also be made from ZnS and ZnSe for certain applications. Antireflection coatings can be provided on all incident surfaces to limit light losses.

Optical device 40 can be formed from a single piece of material, or it can be assembled from separate prisms which can be cemented together or mounted in an appropriate holder (not shown). All of the angles in optical device 40 must have a tolerance of 30 seconds, or less, in order to make the input beam 50 and the output beam 56 collinear.

Devices 10 and 40 have been successfully used with a Krypton ion laser emitting at 476, 530, and 647 nm. In another application, device 40, can be used to rotate the polarization of a $CO_2$ laser operating at 10.6 um. In this application, device 40 can be made from ZnSe or ZnS prisms having antireflection coatings.

In the above discussion, devices 10 and 40 have been described as rotating an S-polarized beam into a P-polarized beam. It will be apparent, however, that devices 10 and 40 can also be used to rotate an P-polarized beam into an S-polarized beam in applications where this is desirable.

The invention has been described in detail with particular reference to a preferred embodiment thereof, but it will be understood that variations and modifications can be effected within the spirit and scope of the invention.

I claim:

1. An optical device for rotating the polarization of a linearly-polarized input beam of radiation, said device comprising:

prism means having first means for receiving said input beam and rotating the polarization thereof through a first angle and second means for receiving said beam from said first means and for producing an output beam which is collinear with said input beam, said prism means including a body of light-transmitting material having a plurality of internally-reflecting prismatic surfaces thereon which are disposed to interact in succession with said input beam, said first means including two of said prismatic surfaces, said two surfaces being arranged along an optical axis and being at the same angle relative to said axis, one of said two surfaces being rotated 90° about said axis relative to the other of said two surfaces, and said second means including the remainder of said prismatic surfaces.

2. An optical device for rotating the polarization of a linearly-polarized input beam of radiation, said device comprising:

prism means having first means for receiving said input beam and rotating the polarization thereof through a first angle and second means for receiving said beam from said first means and for producing an output beam which is collinear with said input beam, said prism means including a body of light-transmitting material having a plurality of internally-reflecting prismatic surfaces thereon which are disposed to interact in succession with said input beam, said first means including two of said prismatic surfaces, said second means including the remainder of said prismatic surfaces, and said remainder of the surfaces including means for turning said beam through an angle of 270°.

* * * * *